Nov. 30, 1965 S. F. THUNBERG ETAL 3,221,223
STRUCTURE FOR BY-PASSING RADIO ENERGY TO
THE HOUSING OF ELECTRICAL APPARATUS
Filed Feb. 23, 1962
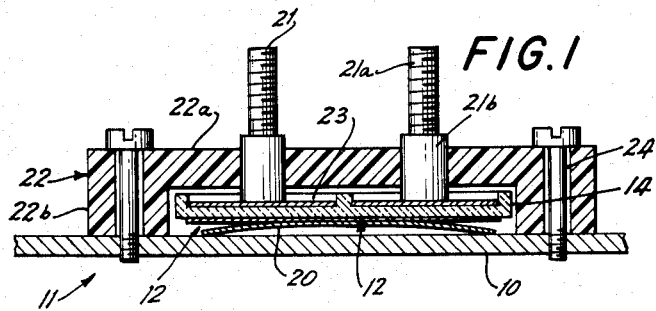
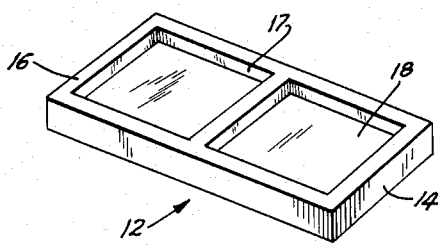
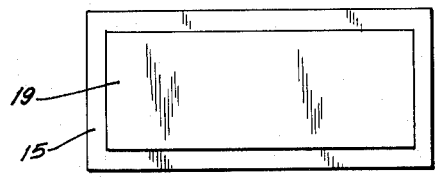
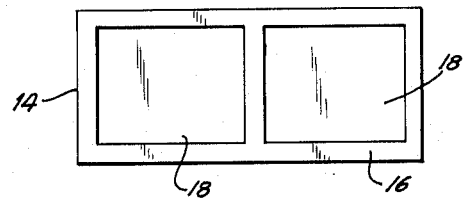
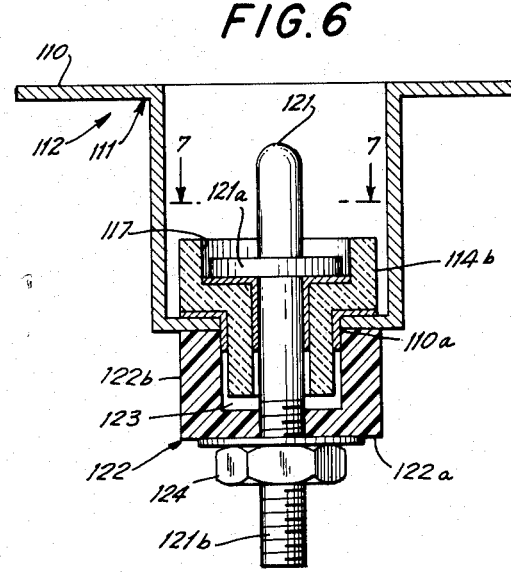
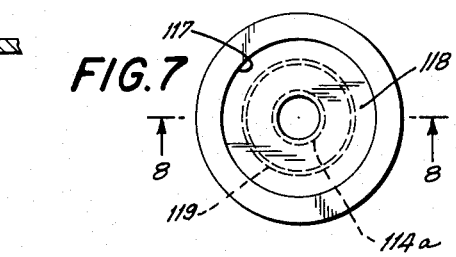
INVENTORS
Sigurd Ferdinand Thunberg
Herbert Deckard Groschupp
BY
Edmund A. Flander
their ATTORNEY

United States Patent Office 3,221,223
Patented Nov. 30, 1965

3,221,223
STRUCTURE FOR BY-PASSING RADIO ENERGY TO THE HOUSING OF ELECTRICAL APPARATUS
Sigurd Ferdinand Thunberg, Stockholm, and Herbert Gerhard Groschopp, Roslags-Nasby, Sweden, assignors to Aktiebolaget Electrolux, Stockholm, Sweden, a corporation of Sweden
Filed Feb. 23, 1962, Ser. No. 175,019
Claims priority, application Sweden, Feb. 25, 1961, 2,011/61
12 Claims. (Cl. 317—242)

Our invention relates to structure for by-passing radio energy to the housing of electrical apparatus.

It is known that radio interference can be reduced in electrical apparatus, such as electrically operated office machines, for example, by employing capacitors to by-pass radio energy to the outer shell or housing whose outer surface normally is contacted when the apparatus is in use. The capacitors previously employed for this purpose often have not been satisfactory because of their mechanical instability and the electrical hazards that are encountered when mechanical failure occurs.

It is an object of our invention to provide an improved capacitor of this character which is formed of ceramic having a high dielectric constant and is mounted on the wall of the apparatus housing in such manner that an exceptionally rigid construction is obtained which is simple and inexpensive to manufacture. We accomplish this by providing a member which overlies a ceramic body at one side of the wall of the housing, such overlying member being associated with an electrical connector or connectors fixed to one of two conductors of a capacitor separated by the ceramic body, the other conductor being in electrically conductive relation with the housing wall.

Further objects and advantages of our invention will become apparent as the following description proceeds, and the features of novelty which characterize our invention will be pointed out with particularity in the claims annexed to and forming a part of this specification.

In the drawing, FIG. 1 is a fragmentary view, in section, of a wall of a housing of electrical apparatus illustrating one manner of mounting a capacitor on the wall in accordance with our invention;

FIG. 2 is a perspective view of the capacitor shown in FIG. 1;

FIGS. 3 and 4 are top and bottom plan views, respectively, of the capacitor illustrated in FIG. 2;

FIG. 5 is a vertical sectional view of the capacitor shown in FIGS. 3 and 4;

FIG. 6 is a fragmentary view, in section, of a wall of a housing of electrical apparatus illustrating another embodiment of the invention;

FIG. 7 is an enlarged fragmentary view taken at line 7—7 of FIG. 6; and

FIG. 8 is a sectional view taken at line 8—8 of FIG. 7.

Referring to the drawing, we have shown our invention applied to a wall 10 of a housing 11 which may form the outer shell of electrical apparatus, such as a calculating machine or cash register, for example. A capacitor 12, which is mounted on the wall 10 in a manner which will be described presently, comprises a single rectangular body 14 of high dielectric constant ceramic, such as barium titanate, for example, having a flat bottom 15 and a top 16 formed with adjacent recesses 17. The bottoms of the recesses 17 and the flat bottom 15 of the ceramic body 14 are metalized at 18 and 19, respectively, with an electrically conductive material, such as silver, for example.

In accordance with our invention, the metalized surfaces 18 and 19 form the conductors of the capacitor 12, the metalized surface 19 being held in electrically conductive relation with the housing wall 10 through a bowed metallic leaf spring 20. A pair of electrical connectors 21, having threaded portions 21a and enlarged heads 21b, bear against the metalized surfaces 18 at the bottoms of the recesses 17 in intimate physical contact therewith.

The capacitor 12 is enveloped by a closure member or cover 22 having a flat side 22a and a side wall 22b projecting therefrom, the extremity of the side wall 22b bearing against the housing wall 10 to form an enclosed space 23 in which the capacitor 12 is held. The cover 22 overlying the capacitor 12 desirably is formed of a suitable insulating material, such as plastic, for example, whose side wall 22b is firmly anchored at 24 to the housing wall 10, as by screws, for example. The enlarged heads 21b are firmly embedded in the cover 22 so that, when the latter is fixed to the housing wall 10 by the screws 24, the heads 21b will press against the metalized surfaces 18 and urge the capacitor 12 toward the housing wall 10 against the action of the bowed leaf spring 20.

In the embodiment illustrated in FIGS. 1 to 5 and just described, the capacitor 12 and insulated cover 22 therefor may form a terminal board to the terminals 21 of which the electrical circuit (not shown) of the electrical apparatus may be connected. A pair of conductors (not shown) may also be connected to the terminals 21 for connecting the electrical apparatus to a source of electrical energy. With this arrangement, radio energy can be effectively by-passed from the electrical apparatus to the outer shell or housing whose outer surface normally is contacted when the apparatus is in use.

The capacitor 12 in FIGS. 1 to 5 is of the so-called "stand-off" or "pig-tail" type. In FIGS. 6 to 8 we have shown another embodiment of the invention in connection with a capacitor 112 of the so-called "feed-through" type which is mounted on a wall 110 of a housing 111 of electrical apparatus, such as an office machine, for example. The capacitor 112 comprises a hollow sleeve or bushing 114 of high dielectric constant ceramic, such as barium titanate, having inner and outer metalized surfaces at 118 and 119, respectively. The inner metalized surface 118 is provided at the bottom of recess 117 at the enlarged end of the hollow bushing 114 and along the wall of the opening 114a extending through the bushing. The outer metalized surface 119 is provided along the outer surface of the bushing 114 at its small end and a shoulder 114b defining the juncture between the small and enlarged ends of the bushing.

The small end of the bushing 114 projects through an opening 110a in the wall 110 so that the outer metalized surface 119 is in intimate physical contact with the housing wall. An electrical connector 121, which snugly fits in the opening 114a of the bushing and is provided with a flange 121a at one end and a threaded section 121b at its opposite end, is in intimate physical contact with the inner metalized surface 118.

As in the first-described embodiment, the capacitor 112 is enveloped by a closure member or cover 122 formed of insulating material and having a flat side or end 122a and a side wall 122b projecting therefrom, the extremity of the side wall bearing against the housing wall 110 to form an enclosed space 123 in which the capacitor 112 is held. The side wall 122b of the closure member 122 is firmly fixed to the housing wall by a tightening nut 124 provided on the threaded section 121b of the electrical connector 121. The threaded section 121b of the electrical connector can serve as a terminal to which the electrical circuit (not shown) of the electrical apparatus may be connected and to which also may be connected one of the conductors (not shown) for connecting the electrical apparatus to a source of electrical energy.

Capacitors 12 and 112 formed of high dielectric constant ceramic will neither deteriorate with time nor burn and they satisfy all of the requirements of the International Commission on Rules for the Approval of Electrical Equipment. These requirements include high electric strength, low impedance and maximum permissible current leakage. The low impedance of the capacitors 12 and 112 is a distinct advantage because this promotes the by-passing of radio energy at the highest possible frequencies to the housings 11 and 111 whose outer surfaces normally are contacted when the apparatus is in use. Thus, the radio interference of office equipment and other electrical apparatus is effectively suppressed, and objectionable high frequency radio energy will not be transmitted from the machine through the conductors connected to the source of electrical supply.

In view of the foregoing, it will now be understood that in each embodiment of the invention we employ a capacitor comprising a single body of ceramic material and provide means for mounting the body of ceramic material on the wall of the housing which is formed of electrically conductive material. Each of the bodies 14 and 114 of ceramic material is mounted in its entirety on the housing wall with one layer of the metalized material having at least portions 19 and 119 essentially parallel to and in electrically conductive relation with a region of the wall of the housing.

It will be seen that we have provided an improvement for by-passing radio energy to a housing of electrical apparatus in which the structures for mounting the capacitors 12 and 112 have maximum mechanical strength and completely protect the ceramic capacitors from damage. Moreover, a simple fabricated consctruction is obtained that is inexpensive and easily manufactured and meets all electrical requirements, such as creepage and flash-over, for example.

Although we have illustrated and described particular embodiments of our invention, we do not wish to be limited to the particular arrangements set forth, and we intend in the following claims to cover all modifications which do not depart from the spirit and scope of our invention.

We claim:

1. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on the wall of the housing with one layer of the metalized material having at least a portion thereof essentially parallel to and in electrically conductive relation with the wall of the housing and at least a part of the body of ceramic material disposed at one side of the housing wall, a self-sustaining apertured member which is independent of and separable from said capacitor, said aperture member being formed of electrical insulating material and overlying and enclosing the ceramic body at the one side of the housing wall, electrical connecting means extending through the apertured electrical insulating member which is accessible at the one side of the housing wall and is in electrically conductive relation with the opposite layer of the metalized material, and said mounting means comprising structure including the apertured insulating member simultaneously urging the portion of the one layer of the metalized material in electrically conductive relation with the wall of the housing and urging the electrical connecting means in electrically conductive relation with the opposite layer of the metalized material.

2. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on the wall of the housing with one layer of the metalized material having at least a portion thereof essentially parallel to and in electrically conductive relation with a region of the wall of the housing and detachable therefrom, a self-sustaining apertured member which is independent of and separable from said capacitor, said apertured member being formed of electrical insulating material and overlying one side of the housing wall at the vicinity of the aforementioned region thereof to electrically insulate the capacitor at the one side of the housing wall, electrical connecting means extending through the apertured insulating member and firmly embedded therein, said electrical connecting means being accessible at the one side of the housing wall and in electrically conductive relation with the opposite layer of the metalized material and detachable therefrom, and said mounting means comprising structure including the apertured insulating member simultaneously urging the portion of the one layer of the metalized material in electrically conductive relation with the region of the wall of the housing and urging the electrical connecting means in electrically conductive relation with the opposite layer of the metalized material.

3. Apparatus as set forth in claim 2 which includes resilient means formed of electrically conductive material interposed between the portion of the one layer of the metalized material and the region of the wall of the housing to bias the capacitor from the wall of the housing.

4. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on one side of the wall of the housing with one layer of the metalized material having at least a portion thereof essentially parallel to and in electrically conductive relation with the housing wall and detachable therefrom, a self-sustaining apertured member which is independent of and separable from said capacitor and formed with a pair of openings, said apertured member being formed of electrical insulating material and overlying and enclosing the ceramic body at the one side of the housing wall, electrical connecting means extending through each of the openings in the apertured member and firmly embedded therein, each of said electrical connecting means being accessible at the one side of the housing wall and in electrically conductive relation with the opposite layer of the metalized material and detachable therefrom, means fixing the apertured insulating member to the wall of the housing at the one side thereof, and said mounting means comprising structure including the apertured insulating member simultaneously urging the portion of the one layer of the metalized material in electrically conductive relation with the wall of the housing at the one side thereof and urging the electrical connecting means in electrically conductive relation with the opposite layer of the metalized material.

5. Apparatus as set forth in claim 4 which includes resilient means of electrically conductive material interposed between the one layer of the metalized material and the one side wall of the housing.

6. In electrical apparatus provided with a housing having a wall formed of electrically conductive material, a capacitor comprising a body of ceramic material having opposing first and second faces thereof respectively provided with first and second layers of metalized material in intimate physical contact therewith, the capacitor being disposed on one side of the wall of the housing with one layer of the metalized material in electrically conductive relation with the housing wall and detachable therefrom, a self-sustaining apertured member which is independent of and separable from said capacitor and formed with a pair of openings, said apertured member being formed of electrical insulating material and overlying and enclosing the ceramic body at the one side of the housing wall, electrical connecting means extending through each of the openings in the apertured member and firmly embedded therein, each of said electrical connecting means being accessible at the one side of the housing wall and in electrically conductive relation with the opposite layer of the metalized material and detachable therefrom, means fixing the apertured insulating member to the wall of the housing at the one side thereof, structure including the apertured insulating member simultaneously urging the one layer of the metalized material in electrically conductive relation with the wall of the housing at the one side thereof and urging the electrical connecting means in electrically conductive relation with the opposite layer of the metalized material, the opposite layer of metalized material including first and second sections having a gap therebetween, and each of said electrical connecting means being in electrically conductive relation with a different one of the sections of the opposite layer of metalized material.

7. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on the wall of the housing with one layer of the metalized material having at least a portion thereof essentially parallel to and in electrically conductive relation with a region of the wall of the housing, electrical connecting means which is accessible at one side of the housing wall and is in electrically conductive relation with the opposite layer of the metalized material, said mounting means comprising structure urging the portion of the one layer of the metalized material in electrically conductive relation with the region of the wall of the housing and urging the electrical connecting means in electrically conductive relation with the opposite layer of the metalized material, said last-mentioned structure being so constructed and arranged that the force developed thereby urging the one layer of the metalized material in electrically conductive relation with the region of the wall of the housing and urging the electrical connecting means in electrically conductive relation with the opposite layer of the metalized material is transmitted through said electrical connecting means, said mounting means structure including an apertured member which is formed of insulating material and overlies the one side of the wall of the housing at the vicinity of the region thereof and through which the electrical connecting means extends, and a resilient element formed of electrically conductive material which is interposed between the one layer of the metalized material and the region of the wall of the housing.

8. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on the wall of the housing with one layer of the metalized material having at least a portion thereof essentially parallel to and in electrically conductive relation with a region of the wall of the housing and detachable therefrom, electrical connecting means which is accessible at one side of the housing wall and is in electrically conductive relation with the opposite layer of the metalized material and detachable therefrom, and said mounting means comprising structure urging the one layer of the portion of the metalized material in electrically conductive relation with the region of the wall of the housing and urging the electrical connecting means in electrically conductive relation with the opposite layer of the metalized material, said urging structure being so constructed and arranged that the force developed thereby urging the portion of the one layer of the metalized material in electrically conductive relation with the wall of the housing and urging the electrical connecting means in electrically conductive relation with the opposite layer of the metalized material is transmitted through said electrical connecting means, said urging structure including an apertured member which is formed of insulating material and overlies the one side of the wall of the housing at the vicinity of the region thereof and through which the electrical connecting means extends, and said electrical connecting means being anchored in the apertured insulating member and said urging structure further including resilient means interposed between the apertured member and the region of the wall of the housing.

9. Electrical apparatus provided with a housing having a wall formed of electrically conductive material, a capacitor comprising a single body of ceramic material having opposing first and second faces thereof respectively provided with first and second layers of metalized material in intimate physical contact therewith, means mounting the capacitor in its entirety on the wall of the housing with one layer of the metalized material having at least a portion thereof essentially parallel to and in electrically conductive relation with a region of the wall of the housing, a self-sustaining apertured member which is independent of and separable from said capacitor, said apertured member being formed of electrical insulating material and overlying one side of the housing wall at the vicinity of the aforementioned region thereof to electrically insulate the capacitor at the one side of the housing wall, electrical connecting means extending through the apertured insulating member which is accessible at the one side of the housing wall and is in electrically conductive relation with the opposite layer of the metalized material, and said mounting means comprising structure including the apertured insulating member simultaneously urging the portion of the one layer of the metalized material in electrically conductive relation with the region of the wall of the housing and urging the electrical connecting means in electrically conductive relation with the opposite layer of the metalized material, the body of ceramic material comprising a hollow sleeve having a passageway therein, the first and second layers of metalized being disposed respectively at the wall of the passageway and at the exterior of the sleeve, the apertured insulating member having an opening therethrough and the electrical connecting means including an elongated element having a first section in the passageway which is in electrically conductive relation with the first layer of metalized material and another section which extends exteriorly of the insulating member through the opening therein.

10. Apparatus as set forth in claim 9 in which the wall of the housing is formed with an opening and the sleeve intermediate its ends is provided with an external shoulder which abuts the wall of the housing at the vicinity of the opening when the capacitor is disposed on the housing, at least a part of the second layer of metalized material at the exterior of the sleeve serving as said portion of the one layer and being disposed at the vicinity of the shoulder, and the other section of the elongated element extending exteriorly of the insulating member passing through the opening in the wall of the housing.

11. Apparatus as set forth in claim 10 in which the sleeve has an enlarged end formed with a recess, the elongated element having a flange bearing against the bottom of the recess, the other section of the elongated element being threaded, and the mounting means structure including a tightening nut on the threaded portion of the elongated member operable to draw the flange against the bottom of the recess and the shoulder against the wall at the vicinity of the opening therein.

12. Apparatus as set forth in claim 11 in which at least a part of the first layer of metalized material at the wall of the passageway is disposed at the bottom of the recess.

References Cited by the Examiner
UNITED STATES PATENTS

| | | | |
|---|---|---|---|
| 2,398,088 | 4/1946 | Ehlers et al. | 317—234 X |
| 2,668,946 | 2/1954 | Bennett | 317—242 X |
| 2,706,798 | 4/1955 | Kodama | 174—52 |
| 2,759,155 | 8/1956 | Hackenberg | 317—242 X |
| 2,895,093 | 7/1959 | Kodama | 317—242 |
| 3,040,214 | 6/1962 | Slavin et al. | 317—242 X |

JOHN F. BURNS, *Primary Examiner.*

JOHN P. WILDMAN, *Examiner.*